United States Patent
Kimura et al.

(10) Patent No.: US 9,322,346 B2
(45) Date of Patent: Apr. 26, 2016

(54) IGNITION CONTROL DEVICE FOR INTERNAL COMBUSTION ENGINE

(71) Applicant: HONDA MOTOR CO., LTD., Tokyo (JP)

(72) Inventors: Noritaka Kimura, Wako (JP); Kosuke Ihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 14/197,774

(22) Filed: Mar. 5, 2014

(65) Prior Publication Data

US 2014/0261319 A1    Sep. 18, 2014

(30) Foreign Application Priority Data

Mar. 12, 2013 (JP) ................................ 2013-049023

(51) Int. Cl.
*F02P 9/00* (2006.01)
*F02D 37/02* (2006.01)
(Continued)

(52) U.S. Cl.
CPC ............ *F02D 37/02* (2013.01); *F02D 41/0002* (2013.01); *F02P 9/002* (2013.01); *F02P 15/08* (2013.01); *F02D 2041/0015* (2013.01); *Y02T 10/42* (2013.01)

(58) Field of Classification Search
CPC .................................. F02P 15/08; F02P 9/002
USPC ................................................ 123/636, 637
See application file for complete search history.

(56) References Cited

U.S. PATENT DOCUMENTS

| 7,404,396 B2 * | 7/2008 | Toriyama | F02P 3/0552 123/598 |
| 2001/0002591 A1 * | 6/2001 | Majima | F02D 37/02 123/406.24 |
| 2007/0175461 A1 * | 8/2007 | Wada | F02P 3/051 123/637 |

(Continued)

FOREIGN PATENT DOCUMENTS

| DE | 199 13 316 A1 | 12/1999 |
| DE | 199 40 854 A1 | 3/2000 |

(Continued)

OTHER PUBLICATIONS

German Search Report dated Mar. 9, 2015 corresponding to German Patent Application No. 10 2014 204 434.0 and English translation thereof.

(Continued)

*Primary Examiner* — Erick Solis
(74) *Attorney, Agent, or Firm* — Squire Patton Boggs (US) LLP

(57) ABSTRACT

An ignition control device for an internal combustion engine, which controls the number of times of ignition operation such that it becomes neither too large nor too small, according to a flowing state of a mixture in a cylinder. In the ignition control device, a target ignition timing is used as an in-cylinder flow parameter indicative of the strength of a tumble flow generated in a cylinder. When the target ignition timing is more advanced than a predetermined reference position, it is determined that the tumble flow is strong, and multiple ignition control is executed by setting the number of times of ignition to a plurality of times, whereas when the former is more retarded than the latter, it is determined that the tumble flow is not strong, and normal ignition control is executed by setting the number of times of ignition to only once.

5 Claims, 7 Drawing Sheets

(51) Int. Cl.
  *F02P 15/08* (2006.01)
  *F02D 41/00* (2006.01)

(56) References Cited

U.S. PATENT DOCUMENTS

| | | | | |
|---|---|---|---|---|
| 2007/0181110 A1* | 8/2007 | Toriyama | F02P 3/0552 | 123/637 |
| 2008/0127937 A1* | 6/2008 | Toriyama | F02P 15/08 | 123/406.12 |
| 2011/0132283 A1* | 6/2011 | Czekala | F02D 37/02 | 123/3 |
| 2011/0144881 A1* | 6/2011 | Glugla | F02P 15/08 | 701/102 |
| 2012/0312285 A1* | 12/2012 | Bolz | F02P 15/08 | 123/623 |

FOREIGN PATENT DOCUMENTS

| | | |
|---|---|---|
| DE | 10 2011 077 357 A1 | 12/2011 |
| JP | 11-037030 A | 2/1999 |
| JP | 2004-263612 A | 9/2004 |
| JP | 2005-201185 A | 7/2005 |
| JP | 2007-224753 A | 9/2007 |
| JP | 2007-327345 A | 12/2007 |
| JP | 2008-169736 A | 7/2008 |
| JP | 2010-116880 A | 5/2010 |

OTHER PUBLICATIONS

German Office Action dated Mar. 9, 2015 corresponding to German Patent Application No. 10 2014 204 434.0 and English translation thereof.
Japanese Office Action application No. 2013-049023 dated Feb. 10, 2015.

* cited by examiner

IGNITION CONTROL DEVICE FOR INTERNAL COMBUSTION ENGINE

BACKGROUND OF THE INVENTION

1. Field of the Invention

The present invention relates to an ignition control device for an internal combustion engine, for controlling an ignition device capable of performing ignition operation a plurality of times in one combustion cycle.

2. Description of the Related Art

A conventional ignition control device for an internal combustion engine of this type is disclosed in Japanese Laid-Open Patent Publication No. H11-37030. This ignition control device detects the rotational speed of the engine and load thereon (opening degree of a throttle vale, for example), and increases the number of times of discharge (ignition operation) of a spark plug in one combustion cycle as the detected rotational speed is lower and also as the detected load is lower. The ignition control device is configured by taking into account a fact that atomization of injected fuel is liable to be insufficient, since the temperatures of a piston and a cylinder are relatively low when both the rotational speed of the engine and the load thereon are low. The ignition performance of the ignition control device is improved by increasing the number of times of discharge and ignition energy.

The above-described conventional ignition control device is based on preconditions that the increase in the number of times of discharge of the spark plug directly leads to improvement in the ignition performance. However, it has been found that the relationship between the number of times of discharge and the advantageous effect of improvement in the ignition performance is not necessarily uniform, and particularly, the relationship largely depends on a flowing state of a mixture in the cylinder. For example, in such a case where in-cylinder flow for causing a mixture to forcibly flow in the cylinder is performed, it is required to ignite a mixture having a very high flow velocity, depending on a set ignition timing. In this case, to ignite the mixture against the high flow velocity without flame blowoff, it is very effective to increase the number of times of discharge, whereas when the flow velocity of the mixture is low, the above advantageous effect can be hardly obtained even if the number of times of discharge is increased.

However, in the conventional ignition control device, when the condition that both the rotational speed of the engine and the load thereon are low is satisfied, the number of times of discharge of the spark plug is controlled to be increased irrespective of the flowing state of the mixture in the cylinder. Therefore, when the flow velocity of the mixture is low, the number of times of discharge of the spark plug is wastefully increased in the state in which the advantageous effect of improvement in the ignition performance can be hardly obtained, whereby erosion of the spark plug proceeds to shorten the service life thereof and increase power consumption.

SUMMARY OF THE INVENTION

It is an object of the present invention to provide an ignition control device for an internal combustion engine, which is capable of controlling the number of times of ignition operation such that it becomes neither too large nor too small, according to a flowing state of a mixture in a cylinder, to thereby ensure sufficient combustion stability and suppress wear and power consumption of an ignition device.

To attain the above object, the present invention provides an ignition control device for an internal combustion engine, for controlling an ignition device which is capable of performing ignition operation for igniting a mixture in a cylinder a plurality of times in one combustion cycle, comprising an in-cylinder flow control device for controlling a strength of in-cylinder flow of a mixture in the cylinder, in-cylinder flow parameter-acquiring means for acquiring an in-cylinder flow parameter indicative of the strength of the in-cylinder flow, in-cylinder flow-determining means for determining, based on a result of comparison between the acquired in-cylinder flow parameter and a predetermined threshold value, whether or not the in-cylinder flow is strong, and ignition control means for executing, when the in-cylinder flow-determining means determines that the in-cylinder flow is strong, multiple ignition control for controlling a number of times of ignition, which is a number of times of ignition operation by the ignition device in one combustion cycle, to a plurality of times, and executing, when the in-cylinder flow-determining means determines that the in-cylinder flow is not strong, normal ignition control for controlling the number of times of ignition to once.

With the configuration of this ignition control device, the strength of the in-cylinder flow of the mixture in the cylinder is controlled by the in-cylinder flow control device. Further, the in-cylinder flow parameter indicative of the strength of the in-cylinder flow is acquired, and it is determined, based on the result of comparison between the acquired in-cylinder flow parameter and the predetermined threshold value, whether or not the in-cylinder flow is strong. When it is determined that the in-cylinder flow is strong, the number of times of ignition, which is the number of times of ignition operation by the ignition device in one combustion cycle, is controlled to a plurality of times (multiple ignition control), whereas when it is determined that the in-cylinder flow is not strong, the number of times of ignition is controlled to once (normal ignition control).

As described hereinabove, the advantageous effect of improvement in the ignition performance by multiple ignition is different depending on the strength of the in-cylinder flow. When the in-cylinder flow is strong, the advantageous effect is high, whereas when the in-cylinder flow is weak, it can be hardly obtained. Therefore, with the above configuration, when it is determined that the in-cylinder flow is strong, it is possible to effectively enhance the ignition performance and sufficiently ensure combustion stability, by executing the multiple ignition control, and performing the ignition operation a plurality of times. On the other hand, when it is determined that the in-cylinder flow is not strong, the normal ignition control is executed to perform ignition operation only once to reduce the number of times of ignition, whereby it is possible to suppress the wear of the ignition device, including erosion of a spark plug, and the power consumption of the ignition device.

Preferably, the in-cylinder flow control device includes a flow control valve for controlling the in-cylinder flow such that the in-cylinder flow becomes stronger as an opening degree of the flow control valve is smaller, and in the multiple ignition control, the ignition control means sets the number of times of ignition to a larger value as the opening degree of the flow control valve is smaller.

With the configuration of the preferred embodiment, as the opening degree of the flow control valve is smaller, i.e. as the in-cylinder flow is stronger, the number of times of ignition during the multiple ignition control is increased to increase ignition energy, whereby it is possible to more accurately obtain the advantageous effect of improvement in the ignition performance by the multiple ignition.

Preferably, the in-cylinder flow control device includes a variable intake timing mechanism capable of changing a valve-closing timing of an intake valve, and in the multiple ignition control, the ignition control means sets the number of times of ignition to a larger value as the changed valve-closing timing of the intake valve is closer to a predetermined reference valve-closing timing at which the in-cylinder flow becomes strongest after an intake bottom dead center.

In a case where the valve-closing timing of the intake valve is changed, the strength of the in-cylinder flow is controlled such that it becomes maximum when the valve-closing timing of the intake valve is at a certain timing after the intake bottom dead center, and becomes smaller as the valve-closing timing of the intake valve is further away from this timing. Because of the above-described relationship, with the configuration of the preferred embodiment, the valve-closing timing of the intake valve at which the in-cylinder flow becomes strongest is determined as the predetermined reference valve-closing timing, and the number of times of ignition during the multiple ignition control is set to a larger value as the changed valve-closing timing of the intake valve is closer to the reference valve-closing timing. As a consequence, according to the valve-closing timing of the intake valve, as the in-cylinder flow is stronger, the number of times of ignition during the multiple ignition control is increased to increase ignition energy, whereby it is possible to more accurately obtain the advantageous effect of improvement in the ignition performance by the multiple ignition.

Preferably, the ignition control device further comprises target ignition timing-setting means for setting a target ignition timing of the ignition device, the in-cylinder flow parameter being the set target ignition timing, and the threshold value being a predetermined reference position in the compression stroke from which the in-cylinder flow becomes weak, and when the target ignition timing is more retarded than the predetermined reference position, the in-cylinder flow-determining means determines that the in-cylinder flow is weak, and the ignition control means executes the normal ignition control.

In the intake stroke, the strength of the in-cylinder flow is controlled according to the opening degree of the flow control valve and the valve-closing timing of the intake valve, and it becomes progressively weaker in the compression stroke following the intake stroke. Therefore, when the target ignition timing is changed, the actual strength of the in-cylinder flow during ignition operation is also changed accordingly. Because of above-described relationship, with the configuration of the preferred embodiment, the target ignition timing is used as the in-cylinder flow parameter, and the predetermined reference position in the compression stroke from which the in-cylinder flow becomes weak is used as the threshold value. When the set target ignition timing is more retarded than the reference position, it is determined that the in-cylinder flow has become weak, so that the normal ignition control is executed. This makes it possible to properly avoid multiple ignition from being performed in a state where the in-cylinder flow is weak, and therefore it is possible to further suppress the wear and power consumption of the ignition device.

More preferably, the predetermined reference position is set to a position at which the in-cylinder flow is controlled to be strongest by the in-cylinder flow control device, and after which position in the compression stroke, it becomes possible to perform ignition by the normal ignition control, as the in-cylinder flow becomes weaker.

With the configuration of the preferred embodiment, assuming a condition that the in-cylinder flow is controlled to be strongest by the in-cylinder flow control device, i.e. a condition which makes it most difficult to successfully perform ignition, a position in the compression stroke whereafter it becomes possible to successfully perform ignition by the normal ignition control as the in-cylinder flow becomes weaker, is set as the predetermined reference position with which the target ignition timing is compared. Therefore, when the target ignition timing is more retarded than the set reference position, the normal ignition control is performed, whereby it is possible to positively perform ignition by the normal ignition control, irrespective of the actual strength of the in-cylinder flow controlled by the in-cylinder flow control device.

More preferably, the predetermined reference valve-closing timing is set to timing at which an amount of intake air drawn into the cylinder becomes maximum after the intake bottom dead center.

In general, the amount of intake air drawn into the cylinder becomes maximum after the intake bottom dead center, due to the inertia of intake air, and when the intake valve is closed at the time the intake air amount has become maximum, and the strength of the in-cylinder flow also becomes maximum. With the configuration of the preferred embodiment, the reference valve-closing timing is set to the timing at which the amount of intake air drawn into the cylinder becomes maximum after the intake bottom dead center, i.e. to the intake valve-closing timing at which the in-cylinder flow becomes strongest, so that it is possible to properly set the number of times of ignition based on the result of comparison between the intake valve-closing timing and the reference valve-closing timing.

The above and other objects, features, and advantages of the present invention will become more apparent from the following detailed description taken in conjunction with the accompanying drawings.

DETAILED DESCRIPTION OF PREFERRED EMBODIMENTS

The invention will now be described in detail with reference to drawings showing a preferred embodiment thereof.

Figure 1:
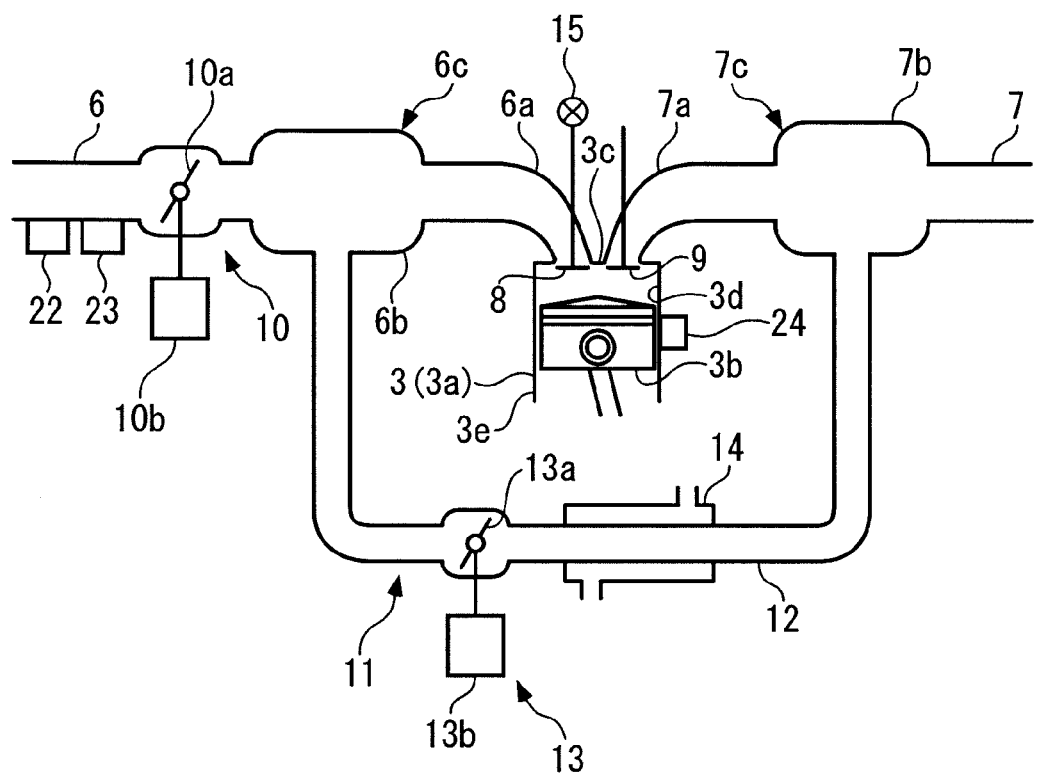
FIG. 1 is a schematic diagram of an internal combustion engine to which the present invention is applied.

FIG. 1 shows an internal combustion engine (hereinafter referred to as the "engine") 3 to which the present invention is applied. The engine 3 is a gasoline engine that has e.g. four cylinders, and is installed on a vehicle, not shown. A combustion chamber 3d is defined between a piston 3b and a cylinder head 3c for each of cylinders 3a (only one of which is shown) of the engine 3.

An intake passage 6 is connected to each cylinder 3a via an intake ports 6a and an intake manifold 6c having an intake collector 6b, and an exhaust passage 7 is connected to each cylinder 3a via an exhaust port 7a and an exhaust manifold 7c having an exhaust collector 7b. The intake port 6a is provided with a fuel injection valve 4 (see FIG. 3) and the cylinder head 3c is provided with an ignition device 5 (see FIG. 3), on a cylinder-by-cylinder basis. Fuel injected from the fuel injection valve 4 is drawn into the cylinder 3a together with air (fresh air) supplied via the intake passage 6, whereby a mixture is formed in the combustion chamber 3d. The injection amount and injection timing of fuel injected by the fuel injection valve 4 are controlled by control signals from an ECU 2, referred to hereinafter.

The ignition device 5 includes a pair of ignition coils (not shown) and a spark plug (not shown) facing the combustion chamber 3d. The ignition device 5 is configured such that charging of one of the ignition coils and discharging of the other of the ignition coils through the spark plug are repeatedly performed in an alternating manner under the control of the ECU 2, whereby it is possible to perform ignition operation for igniting the mixture within the combustion chamber 3d (discharging operation) a plurality of times (e.g. maximum 15 times) in one combustion cycle.

An intake valve 8 and an exhaust valve 9 are provided for each cylinder 3a. A variable intake cam phase mechanism 15 is provided at one end of an intake cam shaft (not shown) for actuating the intake valve 8. The variable intake cam phase mechanism 15 steplessly changes a phase of the intake cam shaft relative to a crankshaft (not shown) of the engine 3 (hereinafter referred to as the "intake cam phase").

As the intake cam phase is changed, a valve-opening timing IVO and a valve-closing timing IVC of the intake valve 8 (hereinafter referred to as the "intake valve-closing timing IVC") are steplessly changed (shifted) with respect to the crankshaft. When the intake valve-closing timing IVC is changed as mentioned above, the strength of a tumble flow, described hereinafter, changes in accordance therewith. Note that the intake cam phase is controlled by actuating a control shaft (not shown) of the variable intake cam phase mechanism 15 by a VTC actuator 15a (see FIG. 3), and the operation of the VTC actuator 15a is controlled by a control signal from the ECU 2.

A throttle valve mechanism 10 is disposed in the intake passage 6 at a location upstream of the intake collector 6b. The throttle valve mechanism 10 includes a pivotally-movable throttle valve 10a disposed in the intake passage 6, and a TH actuator 10b for actuating the throttle valve 10a. The opening degree of the throttle valve 10a is controlled by controlling electric current supplied to the TH actuator 10b by the ECU 2, whereby the intake air amount (fresh air amount) of intake air drawn into the combustion chamber 3d is adjusted.

Figure 2:
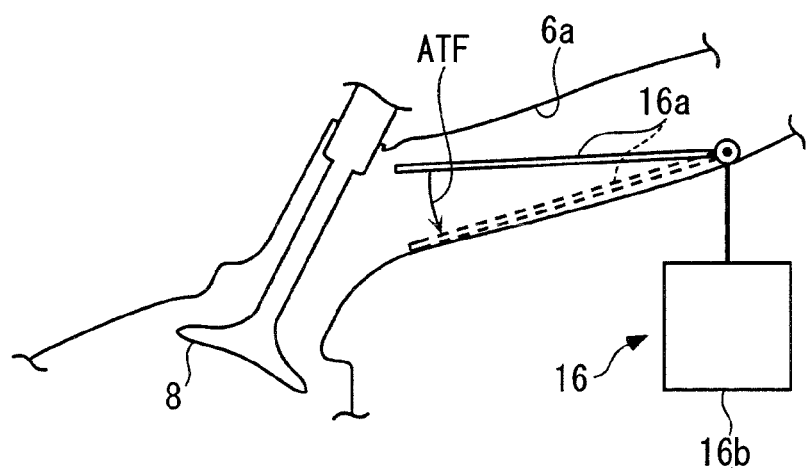
FIG. 2 is a schematic diagram of a variable flap mechanism for controlling the strength of a tumble flow.

As shown in FIG. 2, each intake port 6a is provided with a variable flap mechanism 16. The variable flap mechanism 16 is for improving the combustibility of the mixture by generating a tumble flow as the in-cylinder flow of the mixture within the cylinder 3a. The variable flap mechanism 16 includes a pivotally-movable flap 16a disposed within the intake port 6a, and a flap actuator 16b for actuating the flap 16a.

The flap 16a is pivotally moved between a minimum opening degree position indicated by solid lines in FIG. 2 and a maximum opening degree position indicated by broken lines in FIG. 2. When an opening degree ATF of the flap 16a (hereinafter referred to as the "flap opening ATF") is minimum, the passage area of the intake port 6a is narrowed to the minimum, whereby the strength of the tumble flow becomes maximum, and as the flap opening ATF becomes larger, the strength of the tumble flow becomes smaller. The flap actuator 16b is formed by a combination of a motor and a gear mechanism (neither of which is shown), and the operation thereof is controlled by a control signal from the ECU 2.

Further, the engine 3 is provided with an EGR device 11 for recirculating part of exhaust gases discharged from the combustion chamber 3d into the exhaust passage 7 to the intake passage 6, as EGR gases. The EGR device 11 comprises an EGR passage 12, an EGR valve mechanism 13 disposed in an intermediate portion of the EGR passage 12, and an EGR cooler 14. The EGR passage 12 is connected to the exhaust collector 7b in the exhaust passage 7 and the intake collector 6b in the intake passage 6.

The EGR valve mechanism 13 includes an EGR valve 13a disposed in the EGR passage 12, and an EGR actuator 13b for actuating the EGR valve 13a. The lift amount of the EGR valve 13a is controlled by controlling electric current supplied to the EGR actuator 13b by the ECU 2, whereby an EGR amount GEGR of EGR gases recirculated to the intake passage 6 is adjusted.

Figure 3:
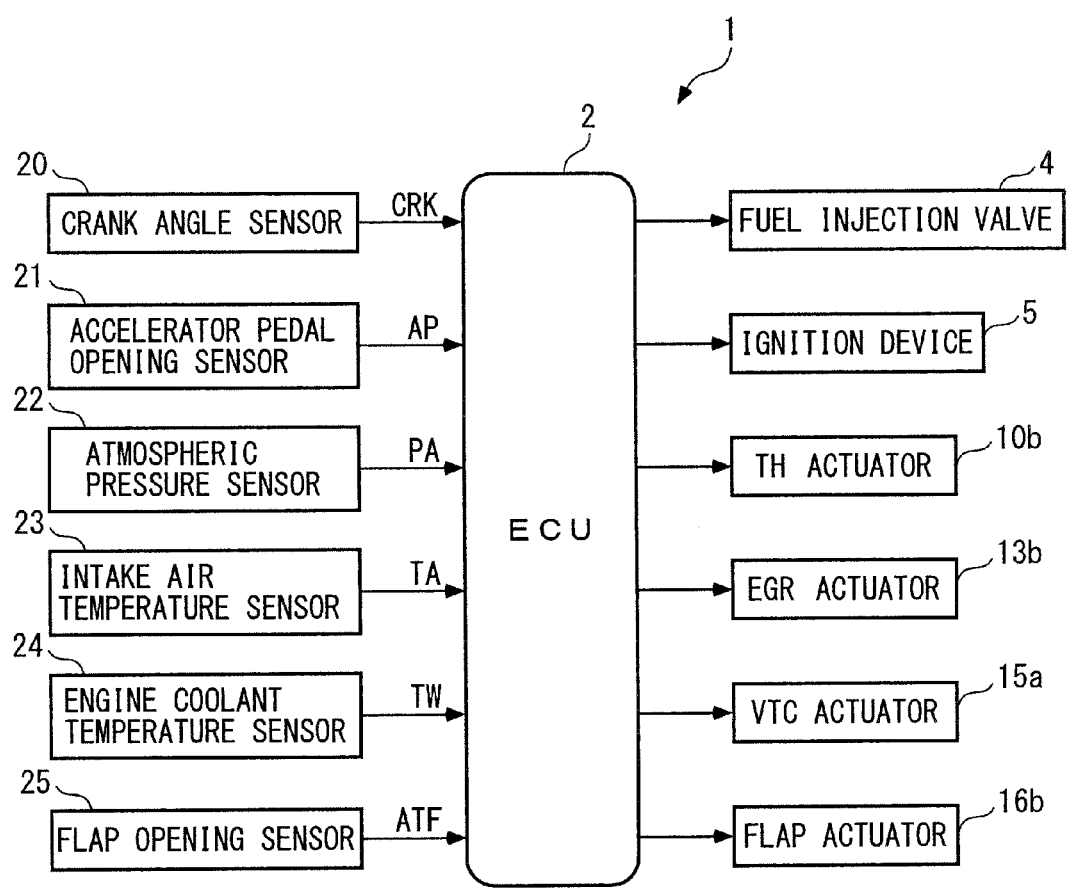
FIG. 3 is a block diagram of an ignition control device.

The crankshaft of the engine 3 is provided with a crank angle sensor 20 (see FIG. 3). The crank angle sensor 20 delivers a CRK signal, which is a pulse signal, to the ECU 2 along with rotation of the crankshaft, whenever the crankshaft rotates through a predetermined crank angle (e.g. 30°). The ECU 2 calculates a rotational speed NE of the engine 3 (hereinafter referred to as the "engine speed NE") based on the CRK signal.

Further, as shown in FIG. 3, also input to the ECU 2 are a detection signal indicative of an operation amount AP of an accelerator pedal (not shown) of the vehicle (hereinafter referred to as the "accelerator pedal opening AP") from an accelerator pedal opening sensor 21, and a detection signal indicative of the flap opening ATF of the variable flap mechanism 16 from a flap opening sensor 25.

An atmospheric pressure sensor 22 and an intake air temperature sensor 23 are provided in the intake passage 6 at respective locations upstream of the throttle valve 10a. The atmospheric pressure sensor 22 detects an atmospheric pressure PA and delivers a signal indicative of the detected atmospheric pressure PA to the ECU 2. The intake air temperature sensor 23 detects a temperature TA of intake air flowing through the intake passage 6 (hereinafter referred to as the "intake air temperature TA") and delivers a signal indicative of the detected intake air temperature TA to the ECU 2. Further, a cylinder block 3e of the engine 3 is provided with an engine coolant temperature sensor 24 which detects a temperature TW of engine coolant of the engine 3 (hereinafter referred to as the "engine coolant temperature TW"), and delivers a signal indicative of the detected engine coolant temperature TW to the ECU 2.

The ECU 2 is implemented by a microcomputer comprising a CPU, a RAM, a ROM and an I/O interface (none of which are specifically shown). The ECU 2 determines the operating conditions of the engine 3 based on the detection signals from the above-described sensors 20 to 25, and executes, depending on the determined operating conditions of the engine 3, various kinds of engine control, including control of the intake air amount, EGR amount, fuel injection amount, and ignition operation of the engine 3.

In the present embodiment, the ECU 2 corresponds to in-cylinder flow parameter-acquiring means, in-cylinder flow-determining means, ignition control means, and target ignition timing-setting means.

Figure 4:
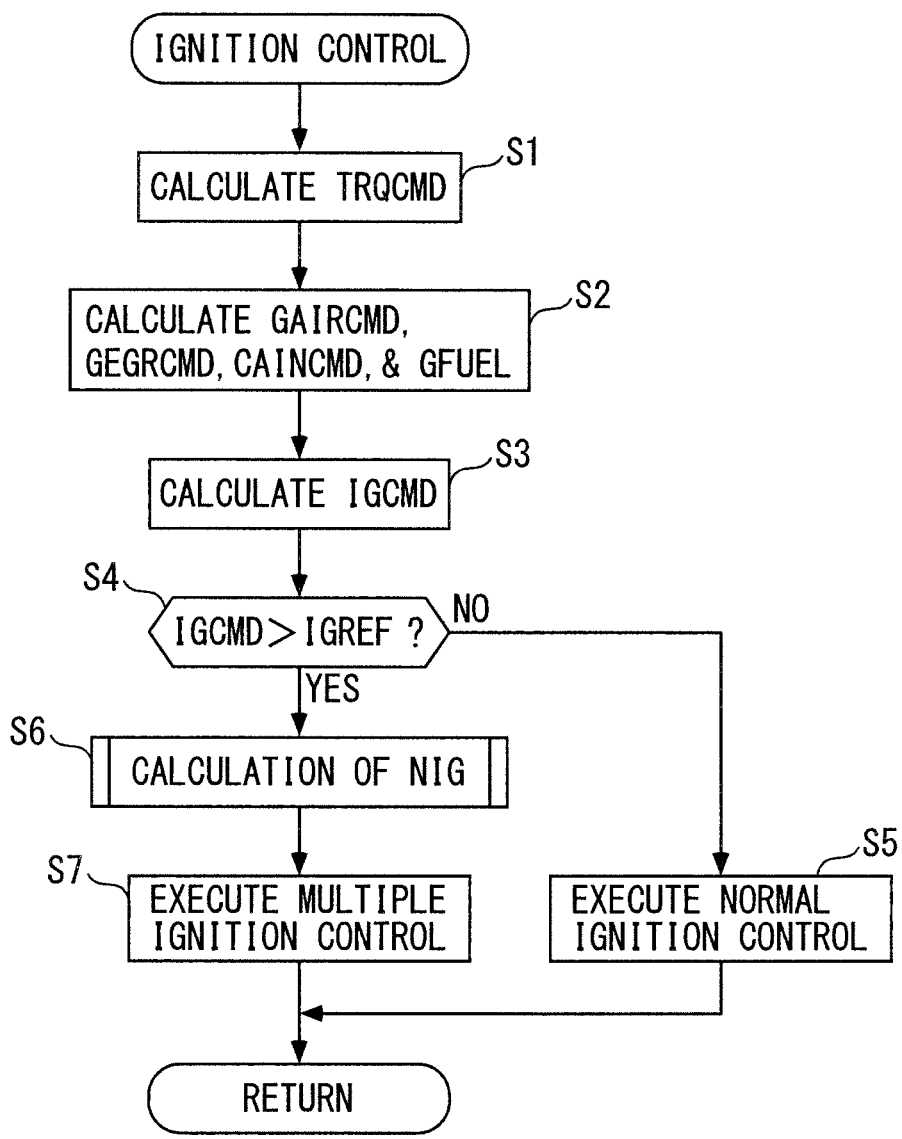
FIG. 4 is a main flowchart of an ignition control process.

Next, an ignition control process for controlling ignition of the engine 3, executed by the ECU 2, will be described with reference to FIG. 4. This process is for determining whether or not multiple ignition by the ignition devices 5 is executable, and setting the number of times of ignition for multiple ignition, and is repeatedly executed at a predetermined repetition period (e.g. one sec.).

In the present process, first, in a step 1 (shown as S1 in abbreviated form in FIG. 4; the following steps are also shown in abbreviated form), demanded torque TRQCMD of the engine 3 is calculated by searching a predetermined map (not shown) according to the detected accelerator pedal opening AP and engine speed NE. In this map, the demanded torque TRQCMD is set such that it is substantially proportional to the accelerator pedal opening AP.

Next, a target intake air amount GAIRCMD, a target EGR amount GEGRCMD, a target intake cam phase CAINCMD, and the fuel injection amount, represented by symbol GFUEL, are calculated by searching respective predetermined maps (none of which are specifically shown) according to the calculated demanded torque TRQCMD and the engine speed NE (step 2).

Then, a target ignition timing IGCMD is calculated (step 3). This target ignition timing IGCMD as well is calculated by searching a predetermined map (not shown) according to the demanded torque TRQCMD and the engine speed NE.

Figure 5:
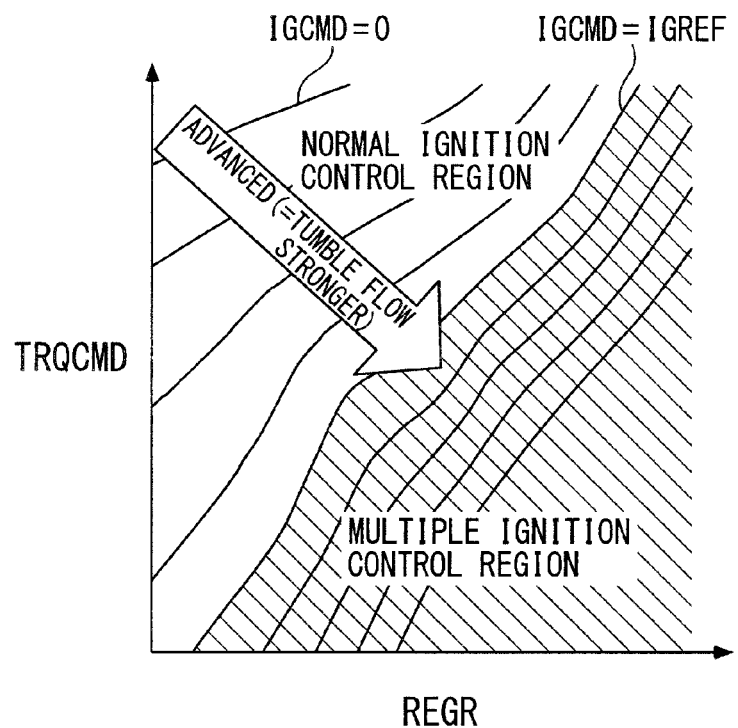
FIG. 5 is a map showing the relationship between demanded torque and an EGR ratio, and a target ignition timing.

FIG. 5 shows the relationship of an EGR ratio REGR and the target ignition timing IGCMD to the demanded torque TRQCMD, out of the engine control parameters calculated as described above, as a contour map of the target ignition timing IGCMD. Note that the EGR ratio REGR is calculated using the target intake air amount GAIRCMD and the target EGR amount GEGRCMD set in the step 2 by an equation: REGR=GEGRCMD/(GAIRCMD+GEGRCMD). Further, the target ignition timing IGCMD is expressed using a crank angle, by setting timing of compression top dead center (TDC) to 0 and representing a timing on a retarded side by a positive value.

Figure 6A:
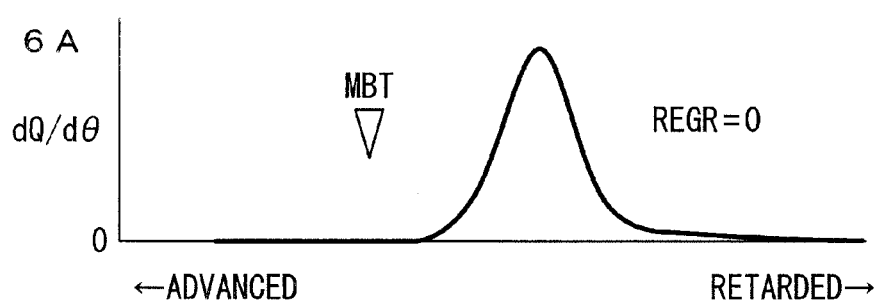
FIGS. 6A and 6B are diagrams showing the relationship between the EGR ratio and an optimum ignition timing.
Figure 6B:
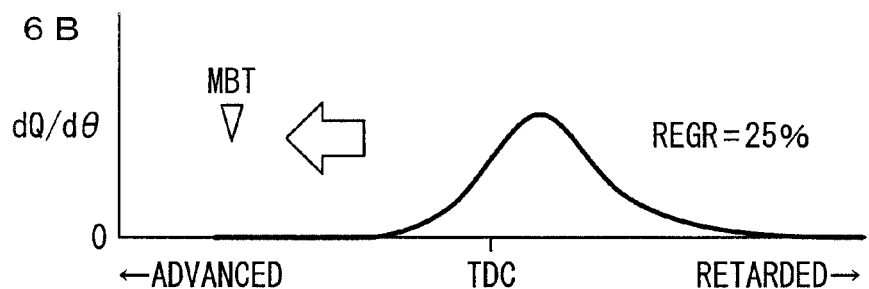

As shown in FIG. 5, as the EGR ratio REGR is larger, the target ignition timing IGCMD is set to be more advanced. This is for the following reason: When the EGR ratio REGR is small, as shown in FIG. 6A, the combustion temperature is high and the combustion time period is short, and hence an optimum ignition timing MBT is located at a crank angle position relatively close to the top dead center of the compression stroke, whereas when the EGR ratio REGR is larger, as shown in FIG. 6B, the combustion temperature becomes lower and the combustion time period becomes longer, so that accordingly the optimum ignition timing MBT moves toward an advanced side.

Further, when the target ignition timing IGCMD is set to be advanced, the ignition operation is performed in a state in which the tumble flow formed in the intake stroke is not very weak, whereas when the target ignition timing IGCMD is set to be retarded close to the compression top dead center, the ignition operation is performed in a state in which the tumble flow is weak.

Because of the above-described relationship, in the present embodiment, the target ignition timing IGCMD is used as an in-cylinder flow parameter indicative of the strength of the tumble flow at the time of execution of ignition operation, and it is determined whether or not the multiple ignition is executable, by comparing the target ignition timing IGCMD with a predetermined reference position IGREF in the compression stroke. Note that the reference position IGREF is set to such a crank angle position that the tumble flow is controlled to be strongest by setting the flap opening ATF of the variable flap mechanism 16 to the minimum and also setting the intake valve-closing timing IVC to a reference valve-closing timing IVCREF, described hereinafter, and ignition can be performed by a single ignition operation from this position and thereafter in the compression stroke, as the tumble flow becomes weaker.

In a step 4 following the step 3, the above-mentioned comparison is made and it is determined whether or not the set target ignition timing IGCMD is larger than the reference position IGREF. If the answer to this question is negative (NO), i.e. if the target ignition timing IGCMD coincides with the reference position IGREF or is more retarded than the same, it is determined that the tumble flow is not strong, and normal ignition control is executed in which the ignition device 5 is caused to perform ignition operation only once in one combustion cycle (step 5), followed by terminating the present process.

On the other hand, if the answer to the question of the step 4 is affirmative (YES), i.e. if the target ignition timing IGCMD is more advanced than the reference position IGREF, it is determined that the tumble flow is strong, and a number NIG of times of ignition is calculated (step 6). Then, multiple ignition control is executed in which the ignition device 5 is caused to perform ignition operation by the number NIG of times in one combustion cycle (step 7), followed by terminating the present process.

As described above, it is determined whether or not the multiple ignition is executable, based on the target ignition timing IGCMD, so that in the FIG. 5 map, a multiple ignition control region is set to a more advanced region than the line of the reference position IGREF (hatched region), whereas a normal ignition control region is set to a region not more retarded than the line of the reference position IGREF (hollow region).

Figure 7:
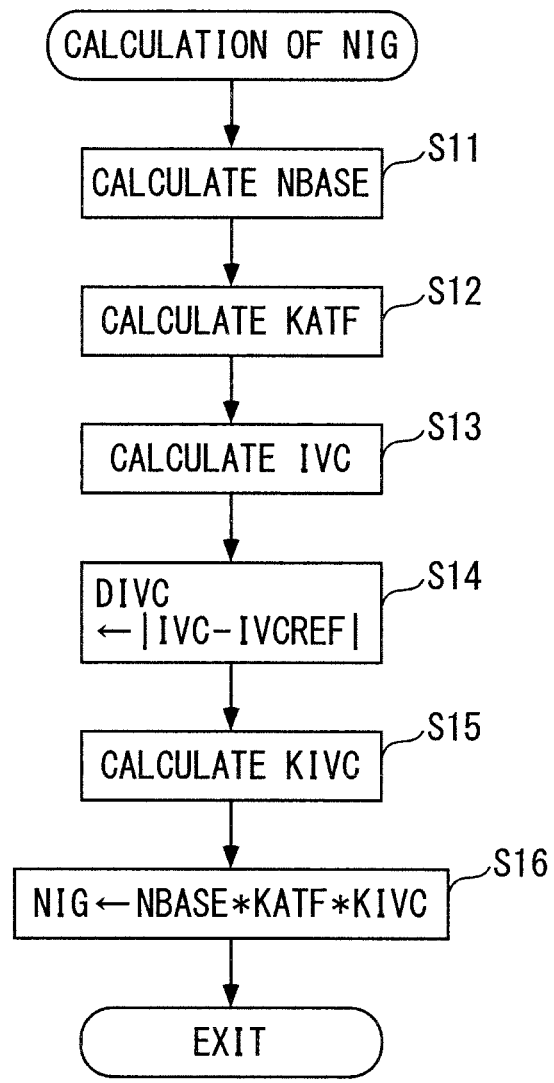
FIG. 7 is a flowchart of a subroutine of a process for calculating the number of times of ignition.

Next, a process for calculating the number NIG of times of ignition executed in the step 6 in FIG. 5 will be described with reference to FIG. 7. In this process, first, in a step 11, a basic value NBASE of the number NIG of times of ignition is calculated by searching a map shown in FIG. 8 according to the target ignition timing IGCMD. The basic value NBASE corresponds to the number of times of ignition which should be set under the condition that the flap opening ATF is minimum and also the intake valve-closing timing IVC coincides with the reference valve-closing timing IVCREF, described hereinafter.

Figure 8:
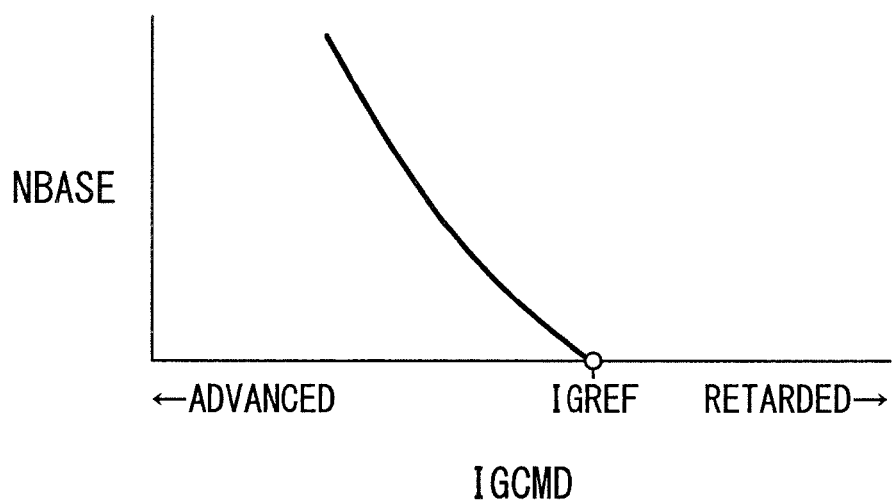
FIG. 8 is a map for use in calculating a basic value of the number of times of ignition.

For this reason, in the map shown in FIG. 8, the basic value NBASE is set to a larger value exceeding 1, within a range more advanced than the reference position IGREF, as the target ignition timing IGCMD is more advanced.

Figure 9:
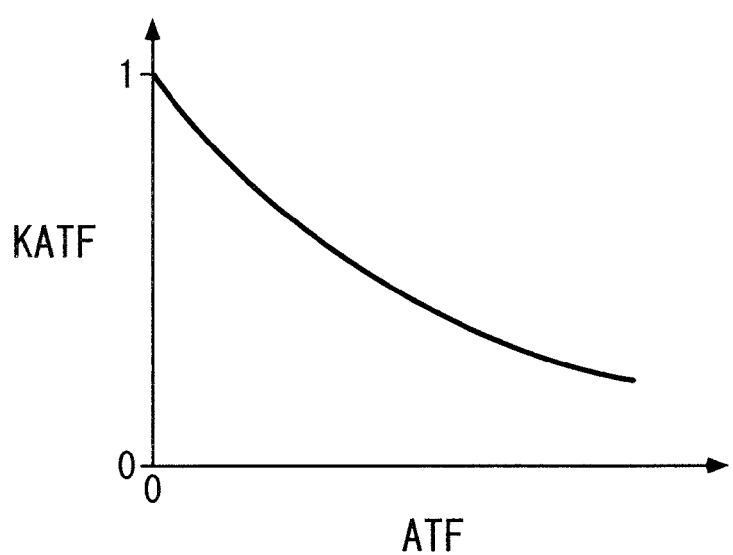
FIG. 9 is a map for use in calculating a flap opening-dependent correction coefficient.

In a step 12 following the above-described step 11, a flap opening-dependent correction coefficient KATF is calculated by searching a map shown in FIG. 9 according to the detected flap opening ATF. In this map, the flap opening-dependent correction coefficient KATF is set to 1 when the flap opening ATF is equal to 0 (minimum opening), and as the flap opening ATF becomes larger, the tumble flow becomes weaker, and hence the flap opening-dependent correction coefficient KATF is set to a smaller value ($0<KTF\leq1$).

Next, the intake valve-closing timing IVC is calculated (step 13). This calculation is performed based on the target intake cam phase CAINCMD set in the step 2 in FIG. 4. Then, the absolute value of the difference between the intake valve-closing timing IVC and the predetermined reference valve-closing timing IVCREF (=|IVC−IVCREF|) is calculated as a valve-closing timing difference DIVC (step 14).

Figure 10:
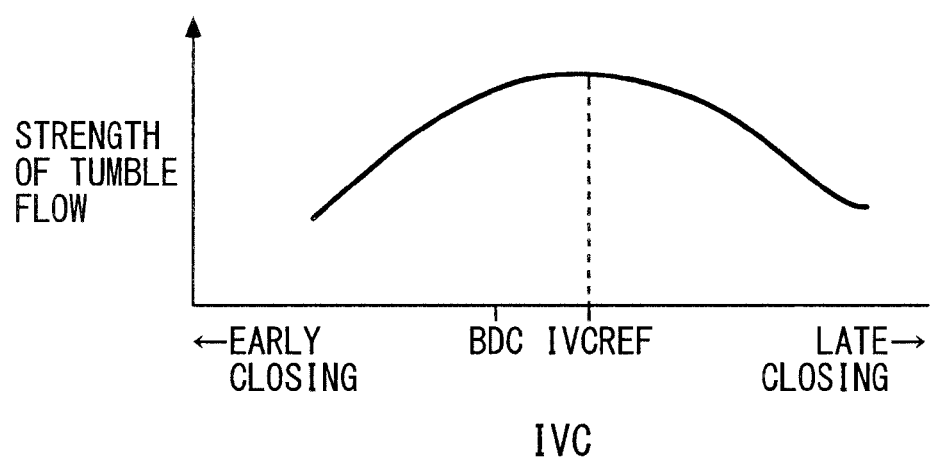
FIG. 10 is a diagram showing the relationship between an intake valve-closing timing and the strength of the tumble flow.

Referring to FIG. 10, the strength of the tumble flow varies with the intake valve-closing timing IVC, and becomes maximum when the intake valve-closing timing IVC corresponds to a certain crank angle position after intake bottom dead center (BDC). This is because the amount of intake air drawn into the cylinder 3a becomes maximum after the intake bottom dead center, due to the inertia of intake air, and when the intake valve 8 is closed at this time of the intake bottom dead center, maximum intake efficiency is obtained and the strength of the in-cylinder flow also becomes maximum. The above-mentioned reference valve-closing timing IVCREF is set to a crank angle position at which the intake air amount becomes maximum and the strongest tumble flow can be obtained, and the valve-closing timing difference DIVC represents a difference of the intake valve-closing timing IVC from the reference valve-closing timing IVCREF.

Figure 11:
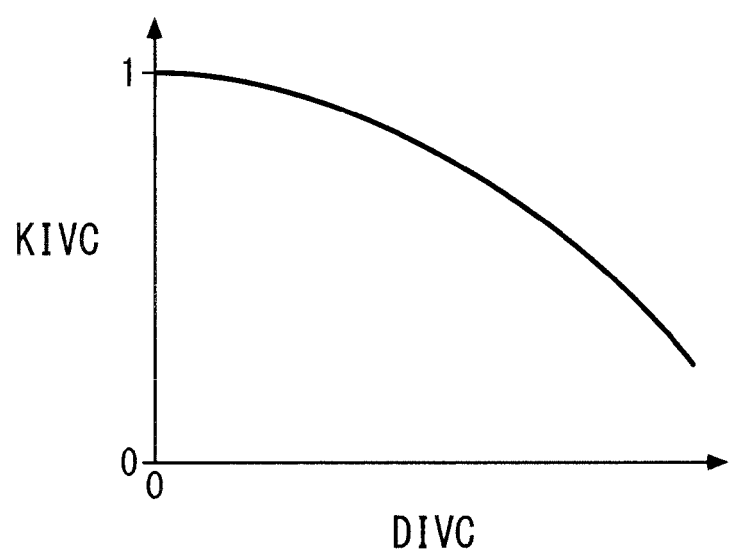
FIG. 11 is a map for use in calculating an intake valve-closing timing-dependent correction coefficient.

Next, an intake valve-closing timing-dependent correction coefficient KIVC is calculated by searching a map shown in FIG. 11 according to the calculated valve-closing timing difference DIVC (step 15). Because of the above-described relationship, in this map, the intake valve-closing timing-dependent correction coefficient KIVC is set to 1 when the valve-closing timing difference DIVC is equal to 0, which means that the intake valve-closing timing IVC coincides with the reference valve-closing timing IVCREF. Further, the intake valve-closing timing-dependent correction coefficient KIVC is set to a smaller value as the valve-closing timing difference DIVC is larger, i.e. as the intake valve-closing timing IVC becomes more different from the reference valve-closing timing IVCREF (0<KIVC≤1).

Next, the number NIG of times of ignition is calculated by multiplying the basic value NBASE calculated in the step 11 by the flap opening-dependent correction coefficient KATF and the intake valve-closing timing-dependent correction coefficient KIVC, and rounding the product up to a whole number (step 16), followed by terminating the present process.

As described hereinabove, according to the present embodiment, the target ignition timing IGCMD is used as the in-cylinder flow parameter indicative of the strength of the tumble flow at the time of execution of ignition operation, and by using the reference position IGREF in the compression stroke from which the tumble flow becomes weak as a threshold value, a comparison is made between the target ignition timing IGCMD and the reference position IGREF. Then, when the target ignition timing IGCMD is more advanced than the reference position IGREF, it is determined that the tumble flow is strong, and the multiple ignition control is executed. This makes it possible to perform multiple ignition in a state in which the tumble flow is strong, whereby it is possible to effectively enhance ignition performance to thereby sufficiently ensure combustion stability.

On the other hand, when the target ignition timing IGCMD coincides with the reference position IGREF or when the target ignition timing IGCMD is more retarded than the reference position IGREF, it is determined that the tumble flow has become weak, and the normal ignition control is executed. This makes it possible to avoid multiple ignition from being performed in a state where the tumble flow is weak, and reduce the number of times of ignition, whereby it is possible to suppress the wear of the ignition device 5, including erosion of the spark plug, and the power consumption of the ignition device 5.

Further, the reference position IGREF is set assuming the condition that the flap opening ATF is minimum and also the intake valve-closing timing IVC coincides with the reference valve-closing timing IVCREF, i.e. the condition that the tumble flow is strongest, making it difficult to successfully perform ignition, so that it is possible to positively perform ignition by the normal ignition control, irrespective of the actual strength of the tumble flow.

Further, the number NIG of times of ignition is calculated by setting the flap opening-dependent correction coefficient KATF to a larger value as the flap opening ATF is smaller, setting the intake valve-closing timing-dependent correction coefficient KIVC to a larger value as the intake valve-closing timing IVC is closer to the reference valve-closing timing IVCREF, and correcting the basic value NBASE using both the correction coefficients KATF and KIVC. This makes it possible to increase the number NIG of times of ignition during the multiple ignition control as the tumble flow is stronger to thereby increase ignition energy, and therefore it is possible to more accurately obtain the advantageous effect of improvement in the ignition performance by the multiple ignition.

Furthermore, the reference valve-closing timing IVCREF is set to timing for maximizing the amount of intake air drawn into the cylinder 3a, i.e. timing at which the tumble flow becomes strongest, after the intake bottom dead center, so that it is possible to properly correct the number NIG of times of ignition according to the result of comparison between the intake valve-closing timing IVC and the reference valve-closing timing IVCREF.

Note that the present invention is by no means limited to the embodiment described above, but can be practiced in various forms. For example, although in the above-described embodiment, the target ignition timing IGCMD is used as the in-cylinder flow parameter for determining whether or not the multiple ignition control is executable, in place of or in addition to this, another suitable parameter indicative of the strength of the in-cylinder flow may be used. In this case, for example, the flap opening ATF and/or the valve-closing timing difference DIVC used for correcting the number NIG of times of ignition in the above-described embodiment can also be used as the in-cylinder flow parameter(s).

Further, in addition to the flap opening ATF and the valve-closing timing difference DIVC employed in the above-described embodiment, other suitable parameters, such as the EGR ratio REGR, the intake air temperature TA, and the engine coolant temperature TW, may be used as parameters for correcting the number NIG of times of ignition. Furthermore, although in the above-described embodiment, the present invention is applied to the engine which generates the tumble flow as the in-cylinder flow, by way of example, this is not limitative, but it is to be understood that the present invention can be applied to an engine which generates a swirling flow.

It is further understood by those skilled in the art that the foregoing are preferred embodiments of the invention, and that various changes and modifications may be made without departing from the spirit and scope thereof.

What is claimed is:

1. An ignition control device for an internal combustion engine, for controlling an ignition device which is capable of performing ignition operation for igniting a mixture in a cylinder a plurality of times in one combustion cycle, comprising:

an in-cylinder flow control device for controlling a strength of in-cylinder flow of a mixture in the cylinder;

in-cylinder flow parameter-acquiring means for acquiring an in-cylinder flow parameter indicative of the strength of the in-cylinder flow;

in-cylinder flow-determining means for determining, based on a result of comparison between the acquired in-cylinder flow parameter and a predetermined threshold value, whether or not the in-cylinder flow is strong;

ignition control means for executing, when said in-cylinder flow-determining means determines that the in-cylinder flow is strong, multiple ignition control for controlling a number of times of ignition, which is a number of times of ignition operation by the ignition device in one combustion cycle, to a plurality of times, and executing, when said in-cylinder flow-determining means determines that the in-cylinder flow is not strong, normal ignition control for controlling the number of times of ignition to once; and target ignition timing-setting means for setting a target ignition timing of the ignition device, wherein the in-cylinder flow parameter is the set target ignition timing, and the threshold value is a predetermined reference position in the compression stroke from which the in-cylinder flow becomes weak, and wherein when the target ignition timing is more retarded than the predetermined reference position, said in-cylinder flow-determining means determines that the in-cylinder flow is weak, and said ignition control means executes the normal ignition control.

2. The ignition control device according to claim 1, wherein said in-cylinder flow control device includes a flow control valve for controlling the in-cylinder flow such that the in-cylinder flow becomes stronger as an opening degree of said flow control valve is smaller, and wherein in the multiple ignition control, said ignition control means sets the number of times of ignition to a larger value as the opening degree of said flow control valve is smaller.

3. The ignition control device according to claim 1, wherein said in-cylinder flow control device includes a variable intake timing mechanism capable of changing a valve-closing timing of an intake valve, and wherein in the multiple ignition control, said ignition control means sets the number of times of ignition to a larger value as the changed valve-closing timing of the intake valve is closer to a predetermined reference valve-closing timing at which the in-cylinder flow becomes strongest after an intake bottom dead center.

4. The ignition control device according to claim 1, wherein the predetermined reference position is set to a position at which the in-cylinder flow is controlled to be strongest by said in-cylinder flow control device, and after which position in the compression stroke, it becomes possible to perform ignition by the normal ignition control, as the in-cylinder flow becomes weaker.

5. The ignition control device according to claim 3, wherein the predetermined reference valve-closing timing is set to timing at which an amount of intake air drawn into the cylinder becomes maximum after the intake bottom dead center.

* * * * *